US 9,246,394 B2

(12) United States Patent
Deng

(10) Patent No.: US 9,246,394 B2
(45) Date of Patent: Jan. 26, 2016

(54) SYNCHRONOUS RECTIFICATION CONTROL CIRCUIT AND POWER SUPPLY THEREOF

(71) Applicant: Silergy Semiconductor Technology (Hangzhou) LTD, Hangzhou, ZheJiang Province (CN)

(72) Inventor: Jian Deng, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 257 days.

(21) Appl. No.: 13/897,966

(22) Filed: May 20, 2013

(65) Prior Publication Data
US 2014/0003096 A1 Jan. 2, 2014

(30) Foreign Application Priority Data
Jul. 2, 2012 (CN) .......................... 2012 1 0230736

(51) Int. Cl.
*H02M 3/335* (2006.01)

(52) U.S. Cl.
CPC ...... *H02M 3/33507* (2013.01); *H02M 3/33592* (2013.01); *Y02B 70/1475* (2013.01)

(58) Field of Classification Search
CPC .............. H02M 3/28; H02M 3/33569; H02M 3/33507; H02M 3/33561; H02M 3/33592; H02M 3/156; H02M 3/33523; H02M 3/335; H02M 3/33515; H02M 3/33576; H02M 3/157; H02M 3/1584; H02M 1/32; H02M 1/4258; H02M 1/4208; H02M 2001/0032; H02M 7/06; H02M 7/068; H02M 7/217; H02M 7/219; H02M 7/10
USPC ................ 363/15, 16, 21.12–21.16, 125–127
See application file for complete search history.

(56) References Cited

U.S. PATENT DOCUMENTS

| 6,069,804 | A  | * | 5/2000 | Ingman et al. | ............. | 363/21.14 |
| 7,688,602 | B2 | * | 3/2010 | Hu            | ............. | 363/21.14 |
| 8,767,418 | B2 | * | 7/2014 | Jungreis et al. | ........... | 363/21.15 |
| 2006/0018135 | A1 | * | 1/2006 | Yang et al.  | ................ | 363/21.14 |

* cited by examiner

*Primary Examiner* — Gary L Laxton
*Assistant Examiner* — Kevin H Sprenger
(74) *Attorney, Agent, or Firm* — Michael C. Stephens, Jr.

(57) ABSTRACT

In one embodiment, a synchronous rectification control circuit in a flyback converter, can include: a first control circuit that receives a drain-source voltage signal of a synchronous rectifier switch and a flyback converter output voltage, and generates a first control signal based on a conduction time of a primary-side power switch; a second control circuit configured to receive the drain-source voltage signal, and to generate a second control signal; when the primary-side power switch is turned off, and the first control signal is greater than a threshold value, the second control signal controls a switching operation of the synchronous rectifier switch; and when the primary-side power switch is turned off, and the first control signal is less than the threshold value, the synchronous rectifier switch is configured to stop operation, before the primary-side power switch is turned on again.

11 Claims, 8 Drawing Sheets

SYNCHRONOUS RECTIFICATION CONTROL CIRCUIT AND POWER SUPPLY THEREOF

RELATED APPLICATIONS

This application claims the benefit of Chinese Patent Application No. 201210230736.9, filed on Jul. 2, 2012, which is incorporated herein by reference in its entirety.

FIELD OF THE INVENTION

The present invention relates to the field of synchronous rectification, and more specifically to a synchronous rectification control circuit and a switch mode power supply.

BACKGROUND

Flyback converters are widely used due to isolated input-output voltages, relatively low product cost, relatively low space requirements, and other benefits. However, when the output current is relatively high and the output voltage is relatively low, conduction losses and reverse recovery losses of a secondary-side rectifier diode in a traditional flyback converter can be relatively high, resulting in reduced efficiency. In one approach, a MOSFET power transistor with relatively low on resistance can be used in a synchronous rectification technique to replace the rectifier diode, and to improve the conversion efficiency of the converter.

SUMMARY

In one embodiment, a synchronous rectification control circuit in a flyback converter, can include: (i) a first control circuit configured to receive a drain-source voltage signal of a synchronous rectifier switch and an output voltage of the flyback converter, and to generate a first control signal based on a conduction time of a primary-side power switch of the flyback converter, where the first control signal, the conduction time of the primary-side power switch, and a primary-side input voltage of the flyback converter, are directly proportional to each other; (ii) a second control circuit configured to receive the drain-source voltage signal, and to generate a second control signal therefrom; (iii) where when the primary-side power switch is turned off, and the first control signal is greater than a threshold value, the second control signal is configured to control a switching operation of the synchronous rectifier switch before the primary-side power switch is turned on again; and (iv) where when the primary-side power switch is turned off, and the first control signal is less than the threshold value, the synchronous rectifier switch is configured to stop operation before the primary-side power switch is turned on again.

Embodiments of the present invention can advantageously provide several advantages over conventional approaches. For example, particular embodiments can provide a synchronous rectification control circuit and a switch mode power supply that may avoid a secondary-side negative current that might otherwise appear when satisfying a minimum synchronous rectifier switch conduction time. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
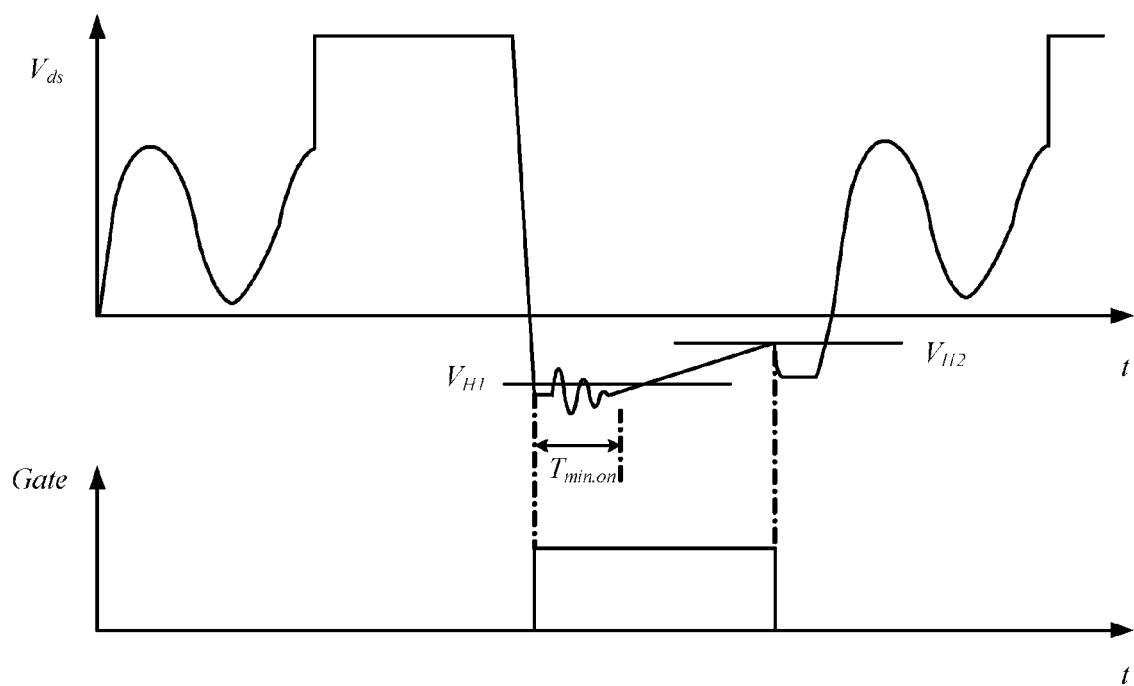
FIG. 1 is a diagram of an example synchronous rectification control approach.

Shown in FIG. 1 is an example synchronous rectification control approach. When a primary-side of the flyback converter is shut down or turned off, drain-source voltage signal $V_{ds}$ of the synchronous rectifier switch may decrease significantly until it is reduced, e.g., to a potential of several hundreds millivolts lower than zero (e.g., threshold value $V_{H1}$). Then, control signal Gate may go high to turn on the synchronous rectifier switch. During the rise from a negative voltage to about zero, when drain-source voltage signal $V_{ds}$ reaches a level of predetermined off threshold value $V_{H2}$, control signal Gate may go low to turn off the synchronous rectifier switch.

Figure 2:
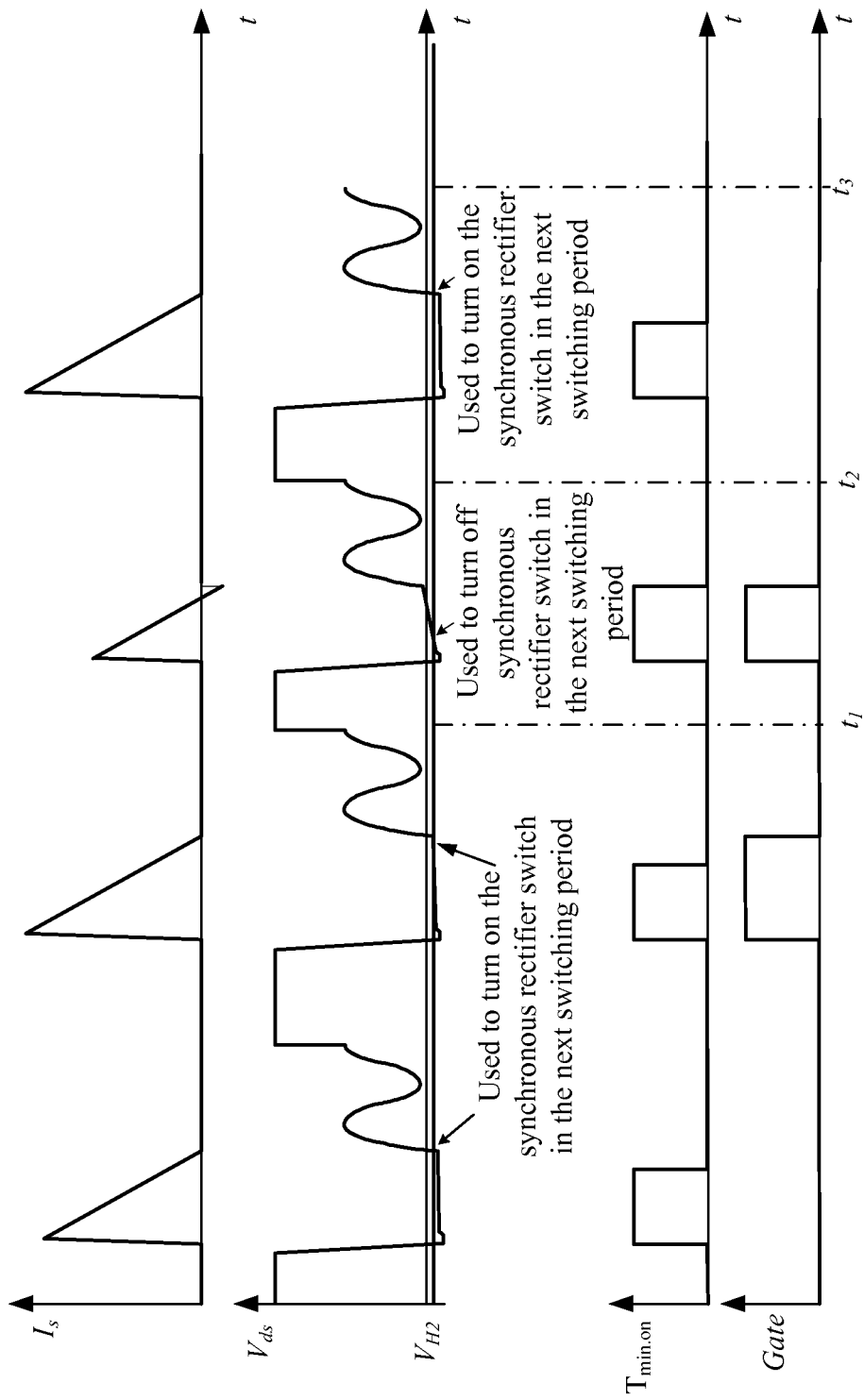
FIG. 2 is an example operating waveform diagram of the synchronous rectification control approach shown in FIG. 1.

In order to prevent an inadvertent off condition of the synchronous rectifier switch that may be caused by oscillation after drain-source voltage signal $V_{ds}$ is reduced to threshold value $V_{H1}$, minimum conduction time $T_{min.on}$ can be set. As a result, when drain-source voltage signal $V_{ds}$ reaches a level of a predetermined off threshold value, if the minimum conduction time condition is not satisfied, the synchronous rectifier switch may remain on to keep conducting. As shown in FIG. 2, from time $t_1$ to time $t_2$, secondary-side current $I_S$ can be reduced to a negative value during a portion of the minimum conduction time due to limited power transmitting capacity of the primary-side. Also, this negative current may result in a reduction of the entire circuit conversion efficiency.

In one approach, the synchronous rectifier switch may be turned off in the next switch period after such a negative current appears. This means that the synchronous rectifier switch can remain off because no Gate signal may be generated from time $t_2$ to time $t_3$ in FIG. 2. Though such an approach may prevent the secondary-side from generating this negative current, negative current in secondary-side current $I_S$ may not be completely eliminated as the synchronous rectifier switch is controlled to turn off in a next switch period after the appearance of the negative current.

In one embodiment, a synchronous rectification control circuit in a flyback converter, can include: (i) a first control circuit configured to receive a drain-source voltage signal of a synchronous rectifier switch and an output voltage of the flyback converter, and to generate a first control signal based on a conduction time of a primary-side power switch of the flyback converter, where the first control signal, the conduction time of the primary-side power switch, and a primary-side input voltage of the flyback converter, are directly proportional to each other; (ii) a second control circuit configured to receive the drain-source voltage signal, and to generate a second control signal therefrom; (iii) where when the primary-side power switch is turned off, and the first control signal is greater than a threshold value, the second control signal is configured to control a switching operation of the synchronous rectifier switch before the primary-side power switch is turned on again; and (iv) where when the primary-side power switch is turned off, and the first control signal is less than the threshold value, the synchronous rectifier switch is configured to stop operation (e.g., a switching operation of the synchronous rectifier switch) before the primary-side power switch is turned on again.

During the conduction interval of the primary-side power switch, a synchronous rectification control circuit in particular embodiments can determine whether the conduction time of the synchronous rectifier switch in a same switch period can meet a minimum conduction time requirement. The synchronous rectifier switch can then be controlled to turn on or turn off according to this result. In this way, secondary-side negative current can be substantially or totally eliminated to save power, and to improve the circuit conversion efficiency. In addition, particular embodiments may support various switch mode power supply operating modes, such as continuous current mode (CCM), discontinuous current mode (DCM), and quasi-resonance mode (QR).

Figure 3:
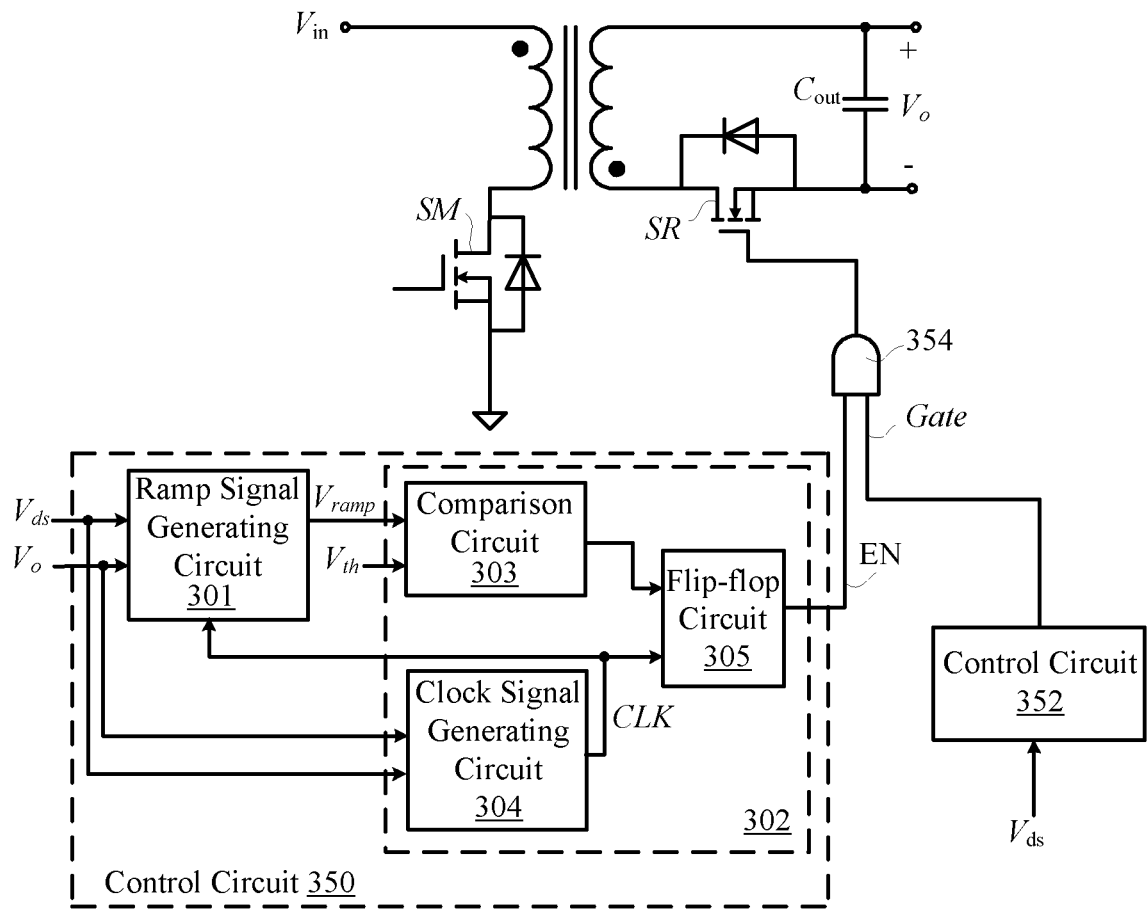
FIG. 3 is a schematic diagram of a first example synchronous rectification control circuit in accordance with embodiments of the present invention.

Referring now to FIG. 3, shown is a schematic diagram of a first example synchronous rectification control circuit in accordance with embodiments of the present invention. For example, a synchronous rectification control circuit of particular embodiments may be used in a flyback converter to control a switching operation of synchronous rectifier switch SR. Of course, the control circuitry of particular embodiments may also be utilized in other types of converters or regulators.

In the particular example of FIG. 3, control circuits 350 and 352 can be employed. Control circuit 350 can receive drain-source voltage signal $V_{ds}$ of synchronous rectifier switch SR, and output voltage $V_o$ of the flyback converter. Control circuit 350 can generate control signal $V_{ramp}$ according to a conduction time of primary-side power switch SM of the flyback converter. In addition, control signal $V_{ramp}$, the conduction time of primary-side power switch SM, and primary-side input voltage $V_{in}$ of the flyback converter may be proportional to each other.

Control circuit 352 can receive drain-source voltage signal $V_{ds}$ to generate control signal Gate. When primary-side power switch SM is turned off, and control signal $V_{ramp}$ is higher than threshold value $V_{th}$, control signal Gate can control a switching operation of synchronous rectifier switch SR before primary-side power switch SM is turned on again.

When primary-side power switch SM is turned off, and control signal $V_{ramp}$ is less than threshold value $V_{th}$, synchronous rectifier switch SR may stop operation before primary-side power switch SM is turned on again. For example, threshold value $V_{th}$ can be set to a value of a corresponding control signal $V_{ramp}$ with respect to a minimum conduction time of the synchronous rectifier switch SR.

In this particular example, control circuit 350 can include ramp signal generating circuit 301 and enable signal generating circuit 302. Ramp signal generating circuit 301 can receive drain-source voltage signal $V_{ds}$, output voltage $V_o$, and clock signal CLK, may generate control signal $V_{ramp}$. For example, control or ramp signal $V_{ramp}$ may be in proportion to a conduction time of primary-side power switch SM and primary-side input voltage of the flyback converter.

Enable signal generating circuit 302 can be used to generate an enable signal EN according to control signal $V_{ramp}$ and threshold value $V_{th}$. The state of enable signal EN can be used to determine whether a switching operation of synchronous rectifier switch SR is controlled by control signal Gate. When primary-side power switch SM is turned off, and control signal $V_{ramp}$ is higher than threshold value $V_{th}$, enable signal EN can be active to ensure that control signal Gate can control the switching operation of synchronous rectifier switch SR before primary-side power switch SM is turned on again. When primary-side power switch SM is turned off, and control signal $V_{ramp}$ is less than threshold value $V_{th}$, enable signal EN can be inactive to ensure that synchronous rectifier switch SR stops the switching operation before primary-side power switch SM is turned on again.

In order to achieve the above functions, enable signal generating circuit 302 can include comparison circuit 303, clock signal generating circuit 304, and flip-flop circuit 305. Comparison circuit 303 can be used to compare control signal $V_{ramp}$ and threshold value $V_{th}$ to generate a comparison signal. Clock signal generating circuit 304 can receive drain-source voltage signal $V_{ds}$ and output voltage $V_o$ to output clock signal CLK. Flip-flop circuit 305 can receive the clock signal and the comparison signal, and may output enable signal EN at a rising edge of clock signal CLK.

During a conduction interval of primary-side power switch SM, the synchronous rectification control circuit in particular embodiments can determine whether the conduction time of synchronous rectifier switch SR in a same switch period can meet a minimum conduction time requirement. The synchronous rectifier switch can be controlled to turn on or turn off according to this result, thus substantially eliminating secondary-side negative current to save power and to improve circuit conversion efficiency. The implementation of control circuit 352 can be any appropriate circuit structure to generate control signal Gate.

Figure 4:
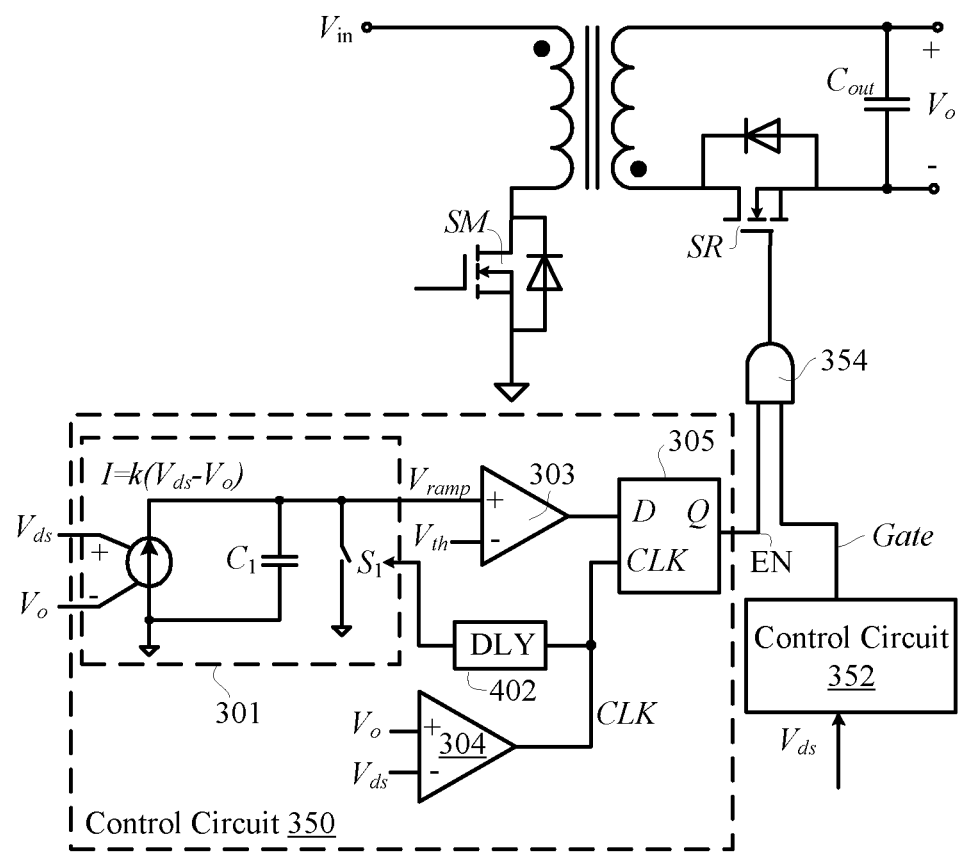
FIG. 4 is a schematic diagram of a second example synchronous rectification control circuit in accordance with embodiments of the present invention.

Referring now to FIG. 4, shown is a schematic diagram of a second example constant voltage constant current controller in accordance with embodiments of the present invention. As shown in this particular example, ramp signal generating circuit 301 can include a voltage controlled current source and a charging circuit that includes capacitor $C_1$ and switch $S_1$. The input voltage of the voltage controlled current source can be a difference between drain-source voltage signal $V_{ds}$ and output voltage signal $V_o$. For example, the output current of the voltage controlled current source may be in direct proportion to the input voltage. Clock signal CLK can be used to control a switching operation of switch $S_1$ to control charging and discharging operation of the charging circuit. Voltage $V_{ramp}$ (e.g., ramp or control signal) may be output from ramp signal generating circuit 301, and may have a ramp-shape across capacitor $C_1$.

Comparison circuit or comparator 303 may have a non-inverting input terminal to receive the control signal $V_{ramp}$, and an inverting input terminal to receive threshold value $V_{th}$. Comparison circuit 303 can output a comparison signal to a D-input of flip-flop circuit 305. The clock signal generating circuit 304 can also be a comparator with a non-inverting input terminal receiving output voltage signal $V_o$, and an inverting input terminal receiving drain-source voltage signal $V_{ds}$. Comparator or clock signal generating circuit 304 may output clock signal CLK as shown. Flip-flop circuit 305 can include a D-type flip-flop, where the D input terminal can receive the comparison signal from comparator 303, and clock signal CLK can be used to control the output time of the comparison signal to generate enable signal EN at the Q output of flip-flop 305.

When clock signal CLK goes high, switch $S_1$ may be on to conduct, and ramp control signal $V_{ramp}$ can be discharged. In order to prevent a timing issue of the output signal of comparator 303 being effectively output by flip-flop 305 when $V_{ramp}$ is discharged, delay circuit 402 can be used to delay clock signal CLK that controls the switching operation of switch $S_1$ by a predetermined delay about DLY.

Figure 5:
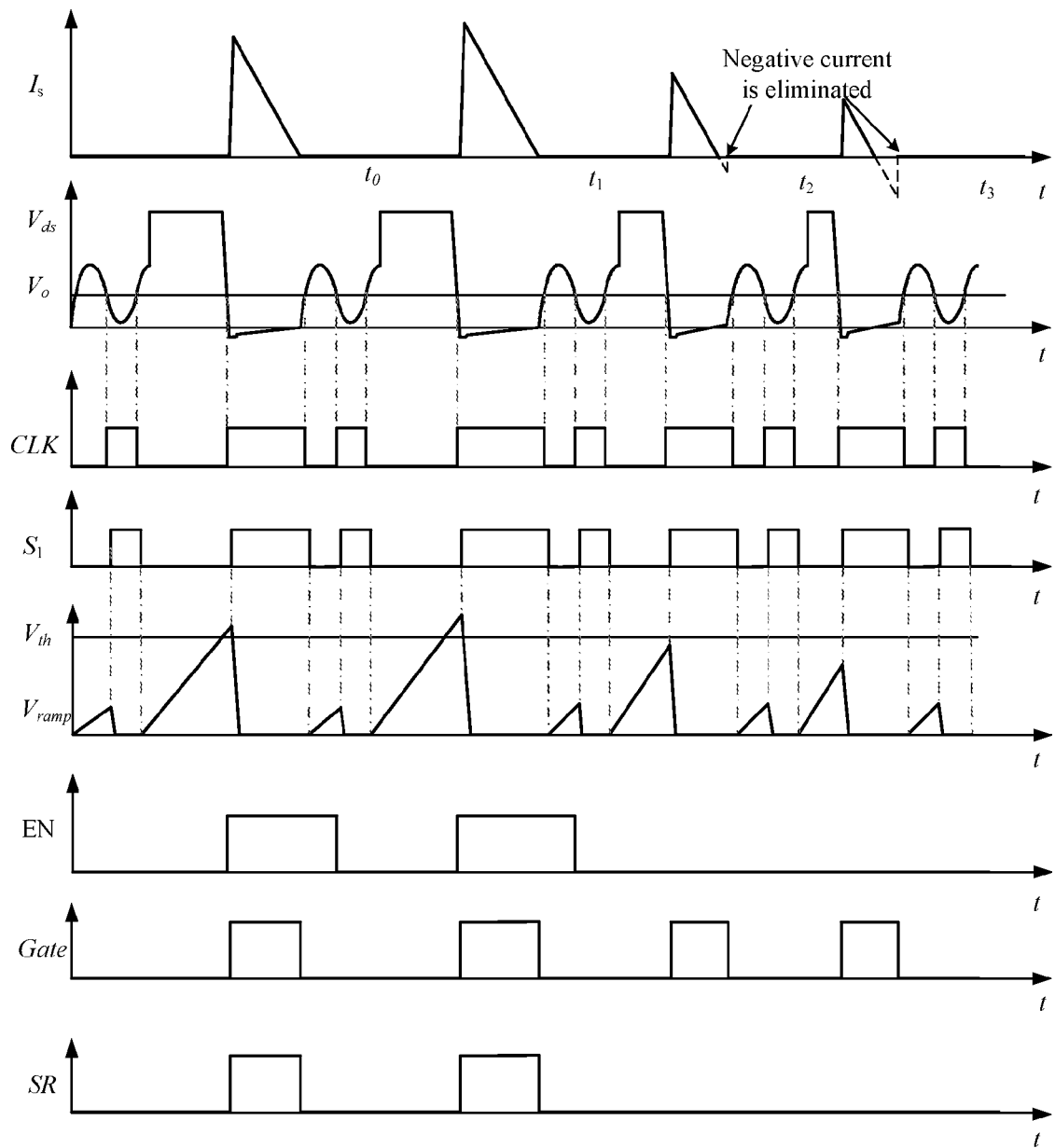
FIG. 5 is an example waveform diagram of the synchronous rectification control circuit shown in FIG. 4 under QR mode.

For example, a synchronous rectification control circuit in particular embodiments can be used in CCM, DCM, or QR operating modes. In this particular example, QR mode may be exemplified when the synchronous rectification control circuit of FIG. 4 is viewed in conjunction with the example operating waveforms of FIG. 5.

For example, k can denote a coefficient of proportionality or a proportional relationship of the output current and the input voltage in the voltage controlled current source. Output current I can be as shown below in Equation 1.

$$I = k(V_{ds} - V_o) \quad (1)$$

During a conduction period of primary-side power switch SM, the drain-source voltage signal of secondary-side synchronous rectifier switch SR may be $$V_{ds} = \frac{V_{in}}{n} + V_o,$$

where n can denote the turns ratio of primary and secondary windings in the flyback converter, and Equation 2 shown below can be obtained.

$$V_{in} = n(V_{ds} - V_o) \quad (2)$$

Deriving from Equations 1 and 2, it can be seen that current I charging capacitor $C_1$ and primary-side input voltage $V_{in}$ can be in a certain proportion relationship (e.g., in direct proportion). When primary-side power switch SM is conducting, drain-source voltage signal $V_{ds}$ can be higher than output voltage signal $V_o$, and clock signal CLK can be low. After a delay time (e.g., via delay circuit 402), switch $S_1$ can be turned off, and output current I of the voltage controlled current source can begin charging capacitor $C_1$. Thus, the charging time of capacitor $C_1$ can approximately be equal to conduction time $t_{on}$ of primary-side power switch SM. In addition, ramp signal $V_{ramp}$ can be denoted by Equation 3, and ramp control signal $V_{ramp}$ can represent a product of primary-side input voltage $V_{in}$ and primary-side power switch SM.

$$V_{ramp} = \frac{k(V_{ds} - V_o)t_{on}}{C_1} \quad (3)$$

When primary-side power switch SM is conducting, the primary-side current peak $$I_{p\text{-}pk} = \frac{V_{in} \times t_{on}}{L_m},$$

where $L_m$ is an equivalent primary-side magnetizing inductance. The secondary-side current peak can be shown as below in Equation 4.

$$I_{s\text{-}pk} = n \times I_{p\text{-}pk} = \frac{n \times V_{in} \times t_{on}}{L_m} = \frac{\frac{V_{in}}{n} \times t_{on}}{\frac{L_m}{n^2}} \quad (4)$$

Thus, conduction time T of secondary-side synchronous rectifier switch SR can be as shown below in Equation 5.

$$T = \frac{I_{s\text{-}pk} \frac{L_m}{n^2}}{V_o} = \frac{V_{in} t_{on}}{n V_o} \quad (5)$$

Therefore, it can be concluded that conduction time T of secondary-side synchronous rectifier switch SR can be proportional to the product of primary-side input voltage $V_{in}$ and conduction time $t_{on}$ of primary-side power switch SM. From equations 3 and 5 above, it can be seen that ramp control signal $V_{ramp}$ can represent conduction time T of synchronous rectifier switch SR. also threshold value $V_{th}$ can set to be a value of the ramp control signal $V_{ramp}$ corresponding to a minimum conduction time of the synchronous rectifier switch.

When the primary-side power switch is turned off, whether a negative current will appear (or not) when turning on the synchronous rectifier switch SR before primary-side power switch SM is conducting, can be detected by comparing ramp control signal $V_{ramp}$ against threshold value $V_{th}$.

During the switch period from time $t_0$ to time $t_1$ (see, e.g., FIG. 5), when primary-side power switch SM is turned off, and ramp control signal $V_{ramp}$ is greater than threshold value $V_{th}$, can mean that in this switching period, if synchronous rectifier switch SR is on, the conduction time of SR can be longer than the minimum conduction time. Thus, at the moment when primary-side power switch SM is turned off, secondary-side current $I_S$ may not become a negative current, so at the turning off time of primary-side power switch SM, drain-source voltage signal $V_{ds}$ may decrease significantly to be less than output voltage signal $V_o$. Also, a rising edge of clock signal CLK can occur, the output of comparator 303 can go high, and the output of flip-flop 305 can be configured as enable signal EN. Therefore, along with enable signal EN, control signal Gate can be used to turn on the synchronous rectifier switch via AND-gate 354.

During the switch period from time $t_1$ to time $t_2$, at the moment when primary-side power switch SM is turned off, and ramp control signal $V_{ramp}$ is less than threshold value $V_{th}$, can mean that in the switching period, if synchronous rectifier switch SR is on, the conduction time of SR can be less than the minimum conduction time, and the negative current may appear at the secondary-side. Thus, the output of comparator 303 can be low, and correspondingly, enable signal EN may be low to keep synchronous rectifier switch SR off. Secondary-side current $I_S$ may decrease to zero due to the function of the body diode of synchronous rectification switch SR to totally avoid the negative current. The operations in the switch period from time $t_2$ to time $t_3$ may be similar.

As seen in the particular example of FIG. 4, the synchronous rectification control circuit can control capacitor charging current to follow a difference variation of drain-source voltage signal $V_{ds}$ and output voltage signal $V_o$. The charging time of capacitor $C_1$ can be controlled to be approximately equal to the conduction time of primary-side power switch SM. Also, a ramp control signal $V_{ramp}$ may be in direct proportion to the conduction time of primary-side power switch SM. Further, by comparing ramp control signal $V_{ramp}$ against threshold value signal $V_{th}$ corresponding to the minimum conduction time, whether control signal Gate should be enabled (e.g., via enable signal EN) in the switching period can be determined. In this way, negative secondary-side current (e.g., in the secondary winding) can be substantially eliminated, and the overall circuit conversion efficiency can be improved.

Figure 6:
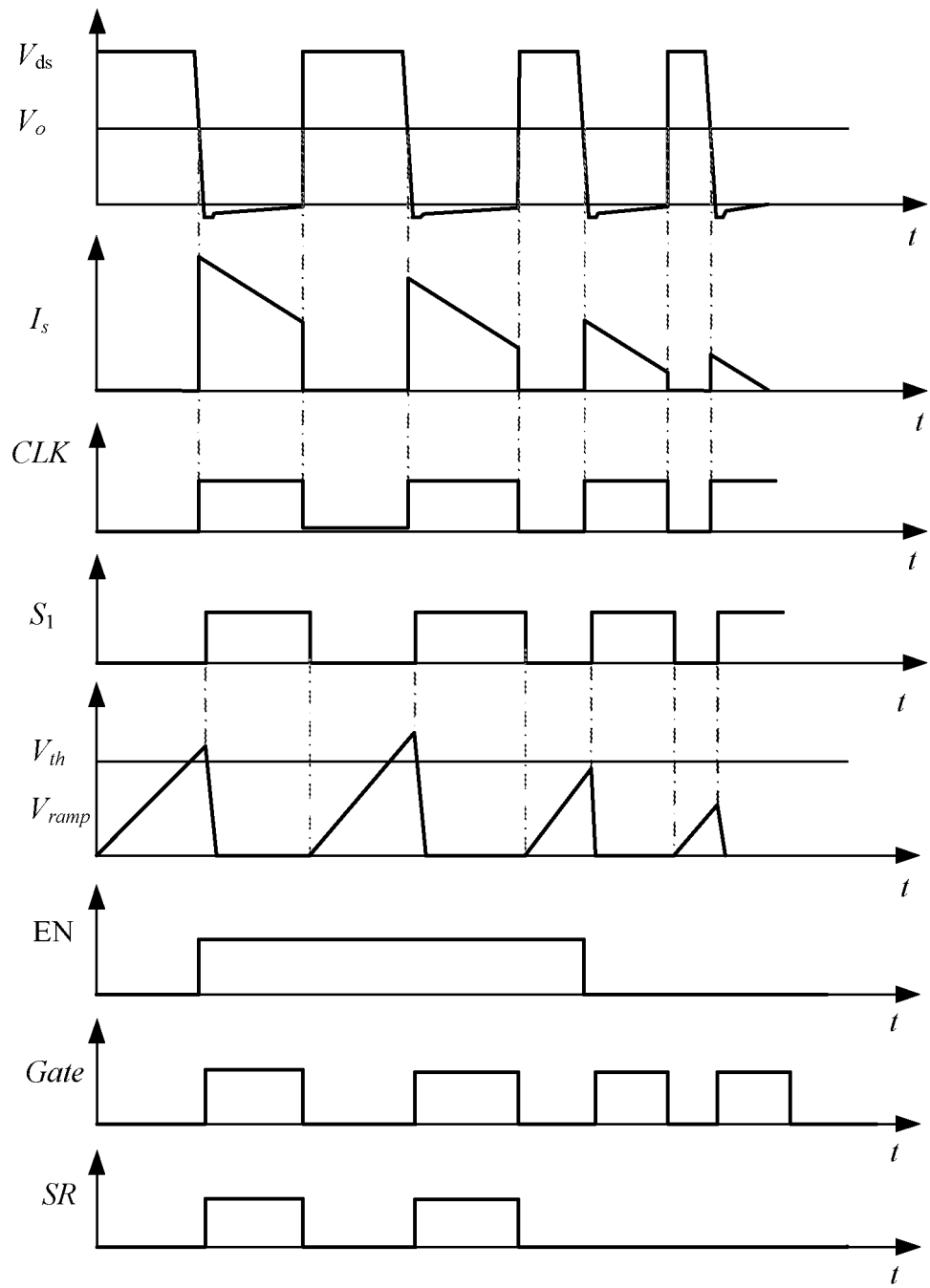
FIG. 6 is an example waveform diagram of the synchronous rectification control circuit shown in FIG. 4 under CCM mode.
Figure 7:
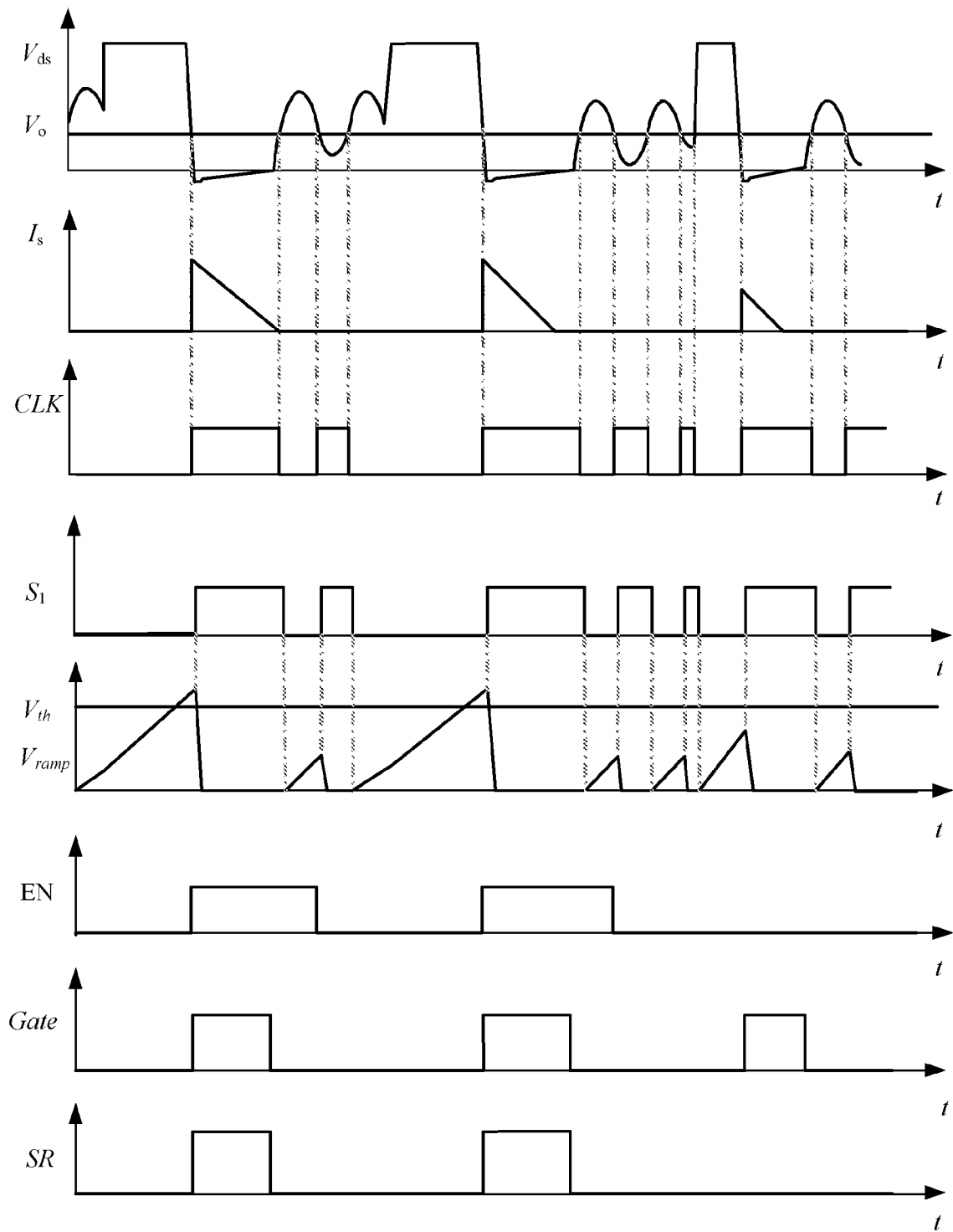
FIG. 7 is an example waveform diagram of the synchronous rectification control circuit shown in FIG. 4 under DCM mode.

While example specific implementations of the ramp signal generating circuit and the enable signal generating circuit are shown and described herein, those skilled in the art will recognize that other appropriate circuit structures can be utilized in particular embodiments. Also, synchronous rectification control circuits described herein may be utilized with various operation modes (e.g., CCM, DCM, QR, etc.) of various converters (e.g., flyback converter, etc.). For example, FIG. 6 is an example waveform diagram of the synchronous rectification control circuit shown in FIG. 4 under CCM mode, and FIG. 7 is an example waveform diagram of the synchronous rectification control circuit shown in FIG. 4 under DCM mode.

Figure 8:
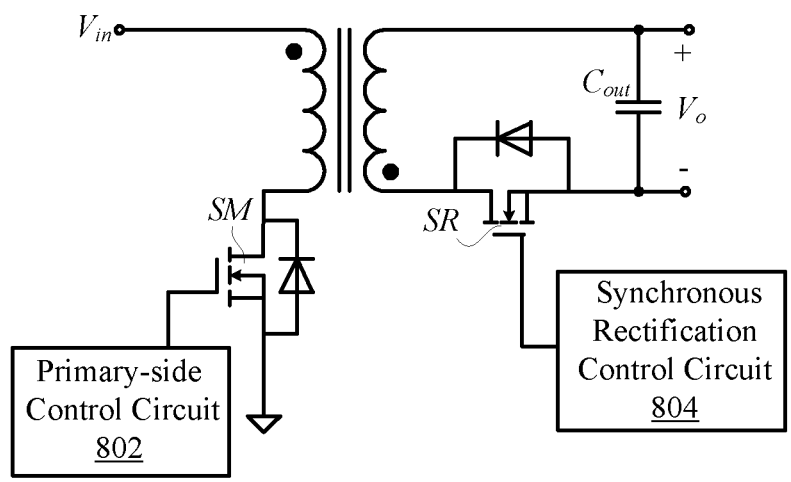
FIG. 8 is a schematic diagram of an example power supply in accordance with embodiments of the present invention.

Referring now to FIG. 8, shown is a schematic diagram of an example power supply in accordance with embodiments of the present invention. In this example, the power supply can include a transformer with a primary winding and a secondary winding. The transformer can be used to transmit input voltage to the secondary-side. Primary-side power switch SM can be series connected with the primary winding, and primary-side power switch SM can be used to control the primary-side winding to receive power from input voltage $V_{in}$. Primary-side control circuit 802 can be used to control a switching operation of primary-side power switch SM. Synchronous rectifier switch SR can be series connected with the secondary winding. Synchronous rectification control circuit 804 can be used to control the switching operation of synchronous rectifier switch SR to convert received power to a certain output voltage $V_o$. The particular implementations can be any suitable synchronous rectification control circuits.

The foregoing descriptions of specific embodiments of the present invention have been presented through images and text for purpose of illustration and description of the synchronous rectification control circuit and associated power supply. They are not intended to be exhaustive or to limit the invention to the precise forms disclosed, and obviously many modifications and variations are possible in light of the above teaching, such as alternatives of the logic gates in the control circuit, as well as the topology of the power supply, for different applications.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A synchronous rectification control circuit in a flyback converter, comprising:
    a) a first control circuit configured to receive a drain-source voltage signal of a synchronous rectifier switch and an output voltage of said flyback converter, and to generate a first control signal based on a conduction time of a primary-side power switch of said flyback converter, wherein said first control signal, said conduction time of said primary-side power switch, and a primary-side input voltage of said flyback converter, are directly proportional to each other;
    b) a second control circuit configured to receive said drain-source voltage signal, and to generate a second control signal therefrom;
    c) an enable signal generating circuit configured to generate an enable signal based on said first control signal and a threshold value, wherein said enable signal generating circuit directly receives said first control signal;
    d) wherein when said primary-side power switch is turned off, and said first control signal is greater than said threshold value, said second control signal is enabled by said enable signal to control a switching operation of said synchronous rectifier switch before said primary-side power switch is turned on again; and
    e) wherein when said primary-side power switch is turned off, and said first control signal is less than said threshold value, said synchronous rectifier switch is configured to stop operation before said primary-side power switch is turned on again.

2. The synchronous rectification control circuit of claim 1, wherein said threshold value is substantially equal to a value of said first control signal that corresponds to a minimum conduction time of said synchronous rectifier switch.

3. The synchronous rectification control circuit of claim 1, wherein:
    b) when said enable signal is active, said second control signal is configured to control a switching operation of said synchronous rectifier switch; and
    c) when said enable signal is inactive, said synchronous rectifier switch is configured to stop said switching operation.

4. The synchronous rectification control circuit of claim 3, wherein said enable signal generating circuit comprises:
    a) a comparison circuit configured to compare said first control signal against said threshold value, and to generate a comparison signal;
    b) a clock signal generating circuit configured to receive said drain-source voltage signal and said output voltage, and to generate a clock signal; and
    c) a flip-flop circuit configured to receive said clock signal and said comparison signal, and to output said comparison signal as said enable signal at a rising edge of said clock signal.

5. The synchronous rectification control circuit of claim 4, wherein said first control circuit comprises a ramp signal generating circuit configured to receive said drain-source voltage signal, said output voltage, and said clock signal, and to generate a ramp signal as said first control signal.

6. The synchronous rectification control circuit of claim 5, wherein said ramp signal generating circuit comprises:
    a) a charging circuit comprising a voltage controlled current source and a first capacitor, wherein an input voltage of said voltage controlled current source comprises a difference between said drain-source voltage signal and said output voltage signal, and wherein an output current of said voltage controlled current source is in direct proportion to said input voltage; and b) a first switch, wherein said clock signal is configured to control a switching operation of said first switch to control charging and discharging operation of said charging circuit, wherein a voltage of said first capacitor is configured as said first control signal.

7. The synchronous rectification control circuit of claim 6, further comprising a delay circuit, wherein said clock signal is configured to control said switching operation of said first switch after being delayed by said delay circuit.

8. The synchronous rectification control circuit of claim 5, wherein said comparison circuit comprises a first comparator configured to receive said ramp signal and said threshold value, and to output said comparison signal.

9. The synchronous rectification control circuit of claim 4, wherein said clock signal generating circuit comprises a second comparator configured to receive said output voltage signal and said drain-source voltage signal, and to output said clock signal.

10. A switch mode power supply, comprising:
a) the synchronous rectification control circuit of claim 1;
b) a transformer having a primary winding and a secondary winding, wherein said transformer is configured to transmit an input voltage to a secondary-side;
c) a primary-side power switch coupled in series with said primary winding, wherein said primary-side power switch is configured to control said primary winding to receive power of said input voltage;
d) a primary-side control circuit configured to control a switching operation of said primary-side power switch; and
e) a synchronous rectifier switch coupled in series with said secondary winding, wherein said synchronous rectification control circuit is configured to control a switching operation of said synchronous rectifier switch to convert received electric energy at said secondary-side to a predetermined output voltage.

11. The switch mode power supply of claim 10, wherein an operation mode of said switch mode power supply comprises at least one of a continuous current mode, a discontinuous current mode, and a quasi-resonance mode.

* * * * *